(12) United States Patent
Foltz

(10) Patent No.: US 6,189,567 B1
(45) Date of Patent: Feb. 20, 2001

(54) TANK VALVE MOUNTING ASSEMBLY

(75) Inventor: Dean C. Foltz, Shelbyville, IN (US)

(73) Assignee: Stant Manufacturing Inc., Connersville, IN (US)

( * ) Notice: Under 35 U.S.C. 154(b), the term of this patent shall be extended for 0 days.

(21) Appl. No.: 09/200,236

(22) Filed: Nov. 25, 1998

Related U.S. Application Data

(60) Provisional application No. 60/066,838, filed on Nov. 25, 1997.

(51) Int. Cl.$^7$ .................................................. F16K 24/00
(52) U.S. Cl. ......................... 137/587; 251/144; 251/152; 251/367; 220/89.1
(58) Field of Search .................................... 251/144, 367, 251/152; 137/587; 220/89.1

(56) References Cited

U.S. PATENT DOCUMENTS

| | | | |
|---|---|---|---|
| 4,721,283 | * | 1/1988 | Wilson ................................ 251/63.4 |
| 4,960,153 | * | 10/1990 | Bergsma ............................... 137/587 |
| 4,966,189 | * | 10/1990 | Harris .................................. 137/587 |
| 5,028,244 | * | 7/1991 | Szlaga .................................... 96/163 |
| 5,069,423 | * | 12/1991 | Amorese et al. ...................... 251/144 |
| 5,083,583 | * | 1/1992 | Benjey .................................. 251/144 |
| 5,139,043 | * | 8/1992 | Hyde et al. ............................... 137/43 |
| 5,404,907 | * | 4/1995 | Benjey et al. ......................... 137/587 |
| 5,640,993 | * | 6/1997 | Kasugai et al. ....................... 137/587 |
| 5,680,848 | * | 10/1997 | Katoh et al. .......................... 123/518 |
| 5,775,357 | * | 7/1998 | Regna et al. ............................. 137/43 |
| 5,782,262 | * | 7/1998 | Kim .................................... 137/202 |

\* cited by examiner

*Primary Examiner*—A. Michael Chambers
*Assistant Examiner*—Thomas L. McShane
(74) *Attorney, Agent, or Firm*—Barnes & Thornburg

(57) ABSTRACT

An apparatus for mounting a vent valve assembly in an aperture of a fuel tank comprising a valve assembly including a housing having a body portion and a flange coupled to the body portion and with a retainer block extending from the body portion spaced-apart from the flange and with a valve positioned to lie in the housing. A retainer is adapted to be coupled to an exterior surface of the fuel tank including a body portion defining a passageway being sized to receive the body portion of the housing therein and a seat formed integrally with the body portion of the retainer and extending into the passageway, so that the flange and the retainer block can cooperate with the seat to couple the valve assembly and retainer together.

26 Claims, 5 Drawing Sheets

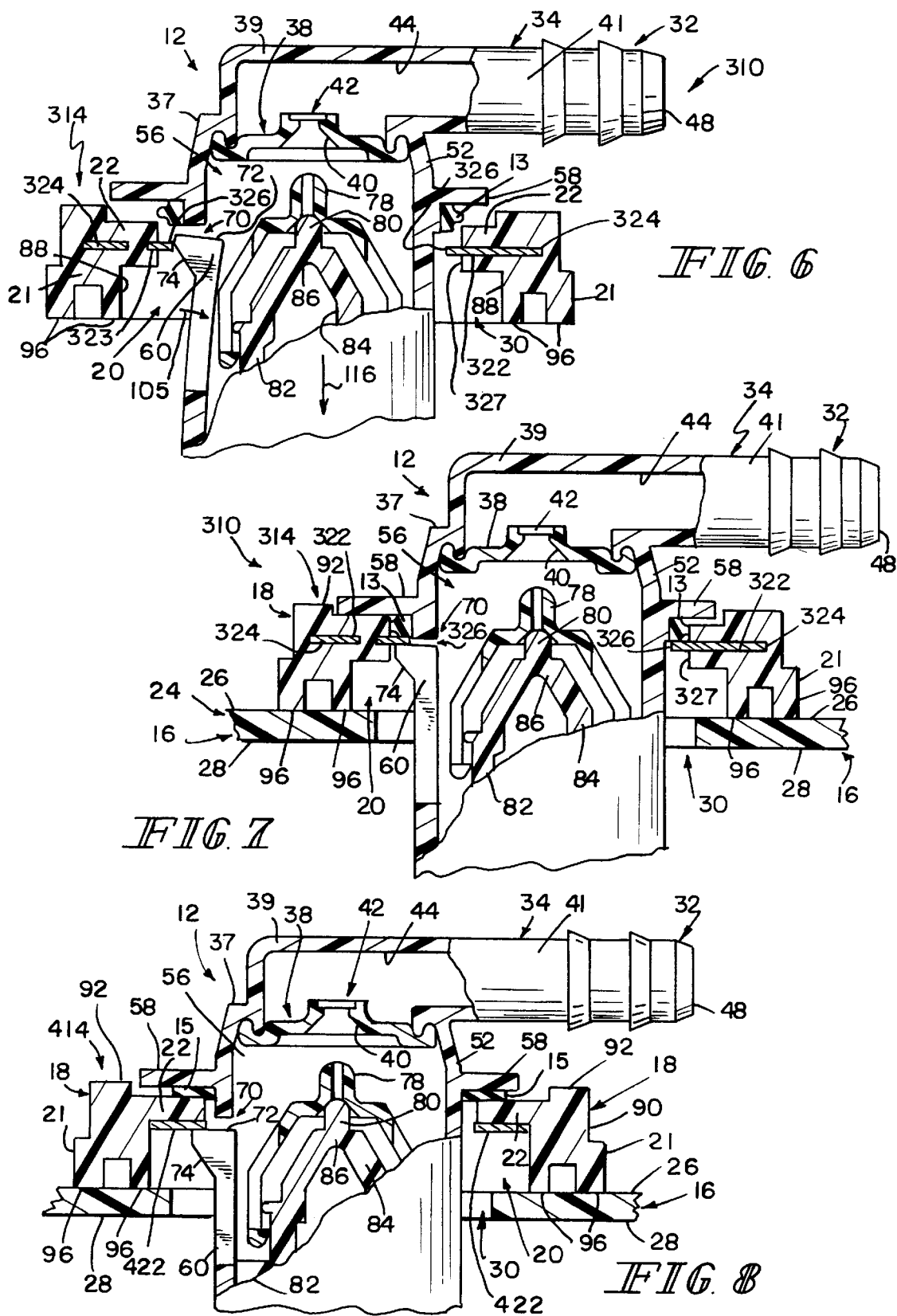

TANK VALVE MOUNTING ASSEMBLY

This claims priority under 35 U.S.C. §119(e) of Ser. No. 60/066,838 filed Nov. 25, 1997.

BACKGROUND AND SUMMARY OF THE INVENTION

This invention relates to a fuel tank valve apparatus and particularly, to a fuel tank valve apparatus that is suitable for use with a fuel tank constructed of a polymeric material. Most particularly, this invention relates to a valve apparatus that is welded to a fuel tank to mount the valve assembly in a fixed position in an aperture formed in the fuel tank.

Mounting assemblies that are used to mount a venting valve assembly in a top wall of a fuel tank are known. See for example, U.S. Pat. No. 4,966,189 to Harris, which is incorporated herein by reference.

According to the present invention, a fuel tank valve apparatus is provided that includes a valve assembly that has a housing with a body portion, a flange coupled to the body portion, and a retainer block extending from the body portion spaced-apart from the flange and a valve positioned to lie in the housing. The fuel tank valve apparatus also includes a retainer adapted to be coupled to an exterior surface of the fuel tank. The retainer includes a body portion that defines a passageway sized to receive the body portion of the housing therein and a seat formed integrally with the body portion of the retainer and extending into the passageway. The flange and the retainer block cooperate with the seat to couple the valve assembly and retainer together.

In preferred embodiments, the seat is fixed in a stationary position within the passageway. In addition, the retainer blocks are formed to flex radically inwardly away from the body portion of the retainer upon engaging the seat during insertion of the valve assembly downward through the passageway formed in the body portion of the retainer and the aperture formed in the fuel tank wall.

During insertion of the valve assembly into the fuel tank through the passageway formed in the body portion of the retainer and the aperture formed in the fuel tank wall (after welding the retainer in its mounted position on the fuel tank wall surrounding the aperture formed in the fuel tank wall), the flexible retainer blocks are cammed "out of the way" by the seat to allow the valve assembly to be moved through the passageway formed in the body portion of the retainer to position the annular mounting flange near an axially outer face of the seat of the welded retainer. At this point, the flexed retainer blocks "snap back" to their original positions and engage against an axially inner face of the seat to retain the valve assembly in a mounted position in the retainer that is welded to the fuel tank.

Additional features of the present invention will become apparent to those skilled in the art upon consideration of the following detailed description of preferred embodiments exemplifying the best mode of carrying out the invention as presently perceived.

BRIEF DESCRIPTION OF THE DRAWINGS

FIG. 6 is a sectional detail view of the fuel tank and valve assembly of FIG. 1 and a retainer in accordance with the present invention during insertion of the body portion of the valve assembly into the passageway of the retainer showing the retainer including a body portion defining a passageway, a seat extending from the body portion into the passageway, and a ring coupled to the seat and extending into the passageway to deflect the retainer blocks included in the body portion of the valve assembly away from the seat;

FIG. 7 is a view similar to FIG. 6 following insertion of the valve assembly through the passageway formed in the retainer and the aperture formed in the fuel tank wall showing the valve assembly being coupled to the axially upper portion of the retainer and an axially lower portion of the retainer welded to the exterior surface of the fuel tank wall;

FIG. 8 is a sectional detail view of the fuel tank and valve assembly of FIG. 1 and a retainer in accordance with the present invention welded to the exterior surface of the fuel tank wall showing the retainer including a body portion defining a passageway, a seat extending from the body portion into the passageway, and a support ring coupled to an axially lower surface of the seat and the valve assembly being coupled to the axially upper portion of the retainer and an axially lower portion of the retainer;

DETAILED DESCRIPTION OF THE DRAWINGS

Figure 1:
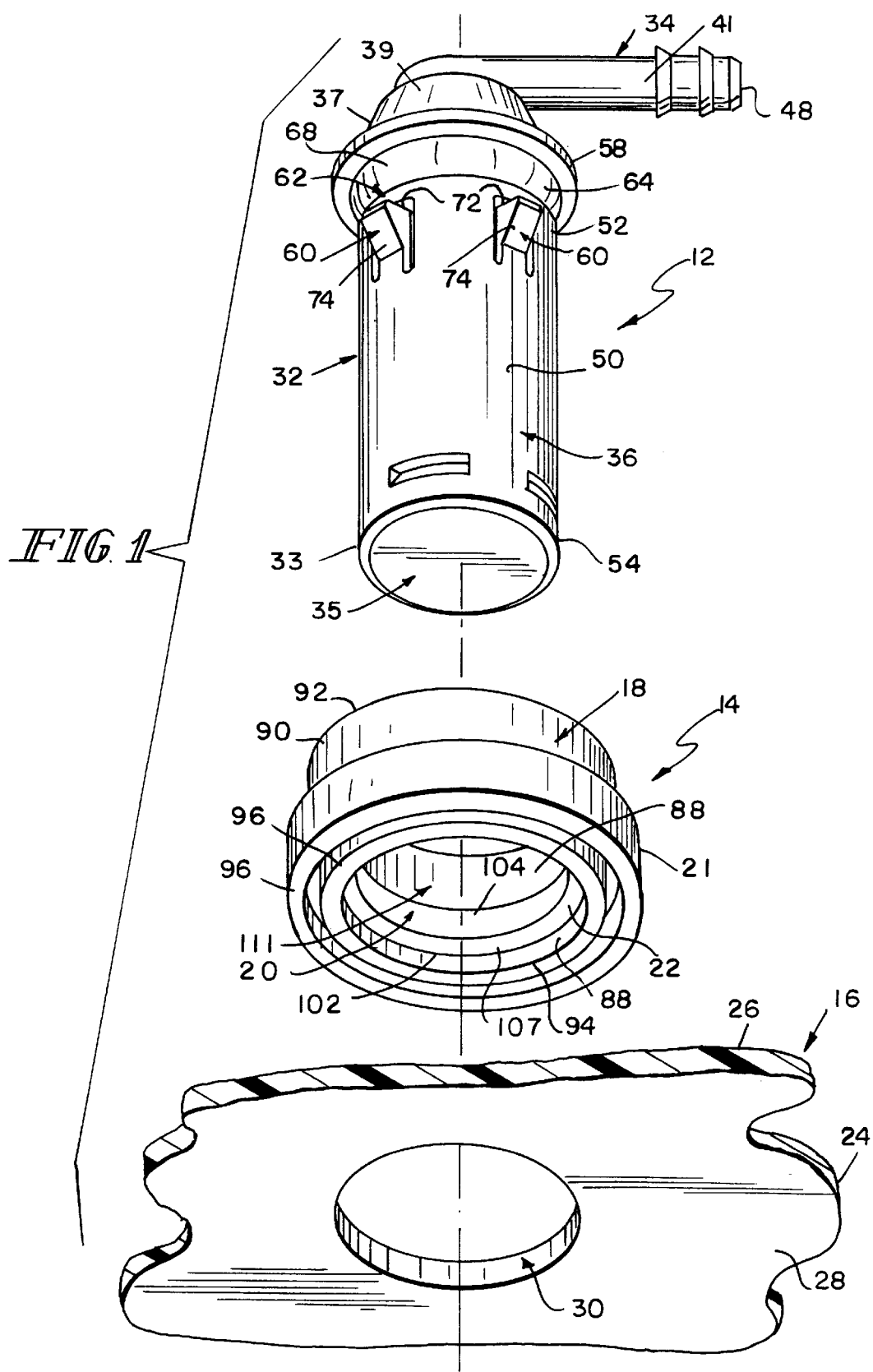
FIG. 1 is an exploded perspective assembly view of a fuel tank valve apparatus in accordance with the present invention with portions broken away, showing a valve assembly including a cylindrical body portion having circumferentially spaced-apart retainer blocks, a fuel tank wall formed to include an aperture sized to receive the cylindrical body portion of the valve assembly therein, and a retainer below the valve assembly and above the fuel tank wall; the retainer including a seat, an axially upper portion configured to be coupled to the valve assembly, and a larger diameter axially lower portion configured to be welded to an exterior surface of the fuel tank wall to mount the valve assembly in a fixed position in the aperture formed in the fuel tank wall.

As shown in FIG. 1, a fuel tank valve apparatus 10 includes a valve assembly 12 and a retainer 14 that couples valve assembly 12 in a fuel tank 16. Retainer 14 is formed to be welded to fuel tank 16 to hold secure valve assembly 12 in a fixed place in fuel tank 16. Specifically, retainer 14 prevents detachment of valve assembly 12 from fuel tank 16 to permit valve assembly 12 to regulate the flow of liquid fuel and fuel vapor (not shown) from fuel tank 16 to a vapor recovery canister (not shown) or other destination outside fuel tank 16.

Referring now to FIG. 1, retainer 14 includes a body portion 18 that defines a central passageway 20 and includes a weld flange 21 that extends away from passageway 20 for engagement with fuel tank 16 and a seat 22 that extends into passageway 20. Further, seat 22 secures valve assembly 12 in a fixed position within fuel tank 16. While retainer 14 will be described with reference to fuel tank 16 and valve assembly 12, it is within the scope of this disclosure to use retainer 14 to couple valve assemblies containing any number of valves therein in a wide variety of fuel tanks.

Figure 2:
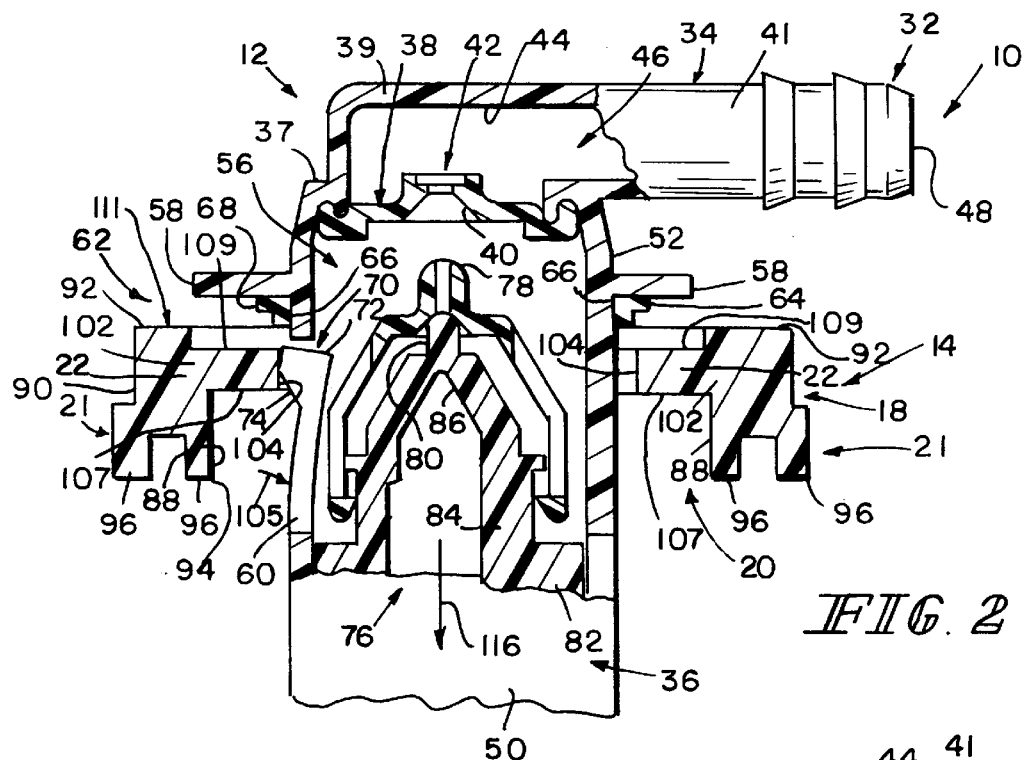
FIG. 2 is a partial cross-sectional view of the fuel tank apparatus of FIG. 1 showing insertion of the body portion of the valve assembly into the passageway formed in the retainer to deflect the retainer blocks included in the body portion away from the seat of the retainer.

Referring now to FIGS. 1 and 2, retainer 14 is formed to be coupled to fuel tank 16. Fuel tank 16 is constructed of a polymeric material that lends itself to blow-molding, such as, for example polyethylene. Fuel tank 16 includes a top wall 24 that has an exterior surface 26, to which retainer 14 is coupled and an interior surface 28 located inside of fuel tank 16. in addition, a vent-outlet aperture 30 is formed in top wall 24 and extends between exterior and interior surfaces 26, 28.

Figure 3:
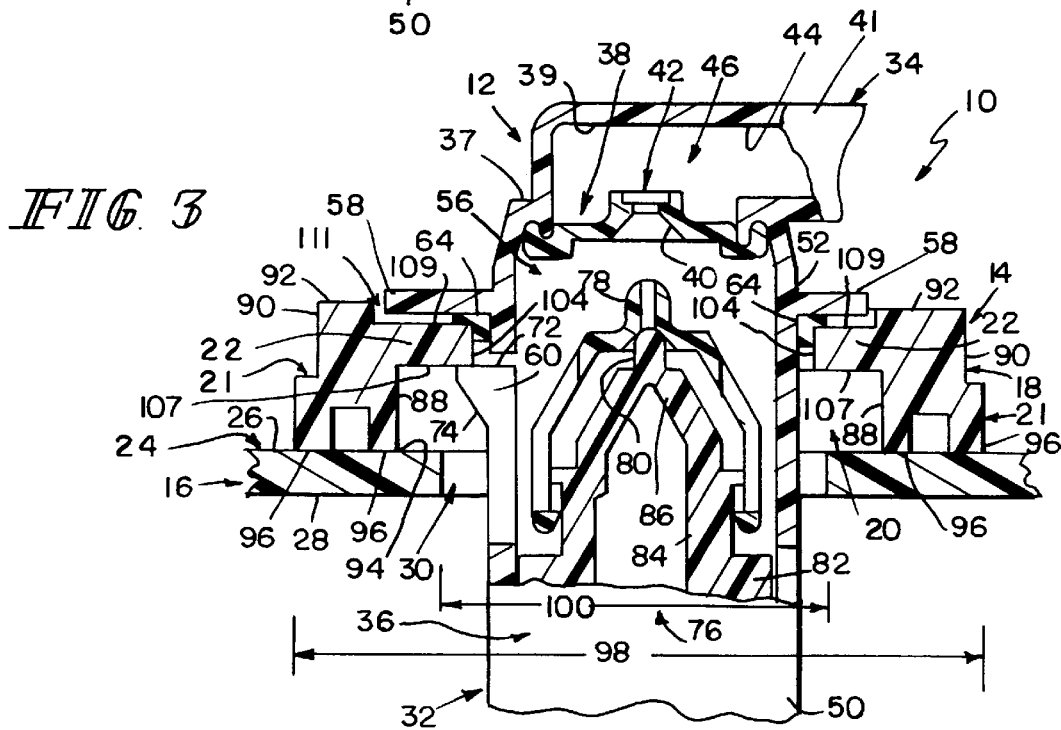
FIG. 3 is a view similar to FIG. 2 following insertion of the body portion through the passageway formed in the retainer and the aperture formed in the fuel tank wall showing the valve assembly being coupled to the axially upper portion of the retainer and the axially lower portion of the retainer being welded to the exterior surface of the fuel tank wall.

Valve assembly 12 is retained in fuel tank 16 by retainer 14. Referring now to FIGS. 2 and 3, valve assembly 12 includes a housing 32 constructed from acetal and including an upper portion 34 that remains outside of fuel tank 16 and a cylindrical lower portion 36 that extends through passageway 20 into fuel tank 16 to communicate with fuel vapor and liquid fuel contained in fuel tank 16. A partition 38 extends between upper portion 34 and lower portion 36. Partition 38 of housing 32 is formed to include an axially downwardly-facing valve seat 40. Valve seat 40 defines an outlet 42.

Referring now to FIG. 3, upper portion 34 of housing 32 is configured to extend away from retainer 14 when the vale assembly 12 is in a fully mounted position in passageway 20 of retainer 14. Upper portion 34 includes an interior wall 44 that defines a vapor-discharge chamber 46 and a vapor-discharge opening 48. Lower portion 36 of housing 32 extends through passageway 20 of retainer 14 and includes a generally cylindrical body portion 50. Body portion 50 includes an axially upper end 52, an opposite terminal end 54, and a central passage 56 extending between upper and terminal ends 52, 54. In addition, lower portion 36 includes a generally annular flange 58 appended to upper end 52 of body portion 50 and retainer blocks 60 spaced-apart from flange 58. As shown in FIGS. 1 and 2, retainer blocks 60 cooperate with flange 58 to define a retention portion 62 therebetween.

Flange 58, as shown again in FIG. 3, is sized to block movement of body portion 58 through passageway 20 toward fuel tank 16. A gasket 64 is positioned to lie within retention portion 62 adjacent to flange 58 to establish a vapor and liquid seal between flange 58 and seat 22 when valve assembly is in its fully mounted position, as shown in FIG. 3. Gasket 64 includes an inner side 66 formed to engage body portion 50 and an outer side 68 formed to engage seat 22. It will be appreciated that this sealed end connection could be accomplished in a number of different ways as long as fuel vapor or liquid fuel is unable to escape fuel tank 14 through the joint between flange 58 and body portion 18.

Retainer blocks 60, as shown in FIG. 2, are positioned to lie adjacent to notches 70 in body portion 50 and are formed to engage seat 22 to block movement of body portion 50 through passageway 20 of body portion 18 away from fuel tank 16 once valve assembly 12 is in the fully mounted position. While only one retainer block 60 and notch 70 will be discussed hereafter, the description applies to each retainer block and each notch. Retainer block 60 projects in an axially upward direction away from terminal end 54 of body portion 50 toward notch 70 formed in body portion 50. Retainer block 60 includes an upwardly facing retainer surface 72 and an angled, radially outwardly facing surface 74 as shown in FIGS. 1–3. Retainer surface 72 is positioned so that it will engage seat 22 when valve assembly 12 is moved toward the fully mounted position in passageway 20 as shown in FIG. 3.

A valve 76 is installed in body portion 50 to control fluid flow through outlet 42. As shown in FIG. 2, valve 76 includes a first nipple 78, a second nipple 80, and a float member 82 arranged in central passage 56 of body portion 50. Float member 82 is movable in central passage 56 to control the discharge of liquid fuel and pressurized fuel vapor from fuel tank 16 through outlet 42 during, for example, sloshing of liquid fuel in fuel tank 16 as a result of vehicle movement of cornering, development of high pressure of fuel vapor in fuel tank 16, filling fuel tank 16 with liquid fuel during refueling, and tilting or inversion of vehicle containing tank as a result of vehicle rollover. Float member 82 includes a top shell 84 formed to include second nipple 80 at its upper end 86. Reference is made to U.S. Pat. No. 5,028,244 entitled "Tank Venting Control Valve Assembly" to Szlaga, for a description of a suitable valve for vent valve apparatus and which is incorporated herein by reference.

Figure 5:
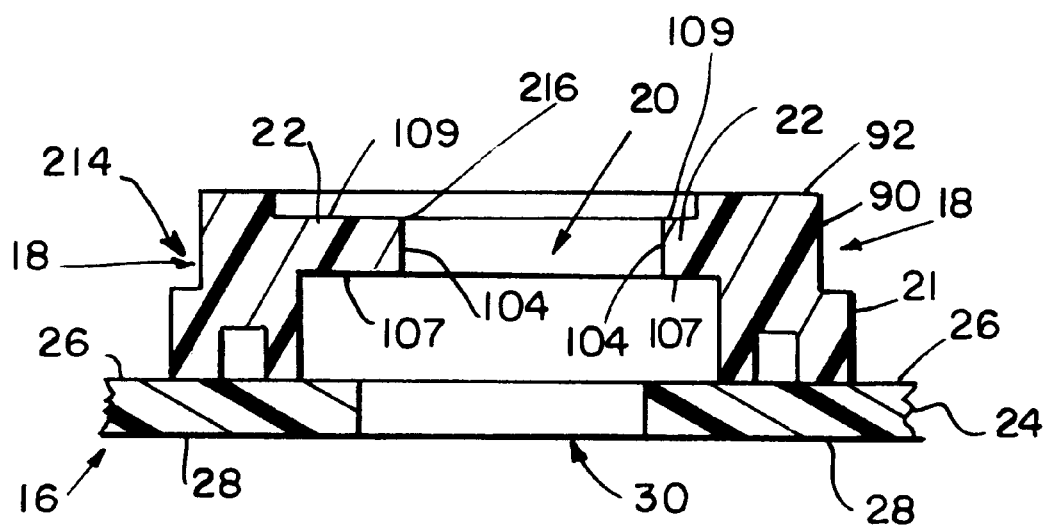
FIG. 5 is a cross-sectional view of the retainer of FIG. 4 welded to a fuel tank.

As shown in FIG. 3 retainer 14 is coupled to lower portion 36 of housing 32 and lies between fuel tank 16 and upper portion 34 of housing 32. Retainer 14 is constructed of a polymer that lends itself to welding to fuel tank 16, such as, for example high density polyethylene. It is within the scope of this disclosure to construct retainer 14 from a wide variety of polymers suitable for welding to fuel tank 16. Referring now to FIG. 3, body portion 18 of retainer 14 is configured to be coupled between flange 58 and retainer block 60 of body portion 50 to block movement of valve assembly 12 in aperture 30 of fuel tank 16. As shown in FIG. 5, body portion 18 further includes an inner side 88 configured to face body portion 50, an outer side 90, an upper portion 92 extending about the periphery of body portion 18, and an opposite lower portion 94. Inner side 88 of body portion 18 defines passageway 20 that extends between outer and lower portions 92, 94.

Weld flange 21 of body portion 18 is configured to be coupled to exterior surface 26 of fuel tank 16, as shown in FIG. 3. Weld flange 21 extends from outer side 90 of body portion 18 adjacent to lower portion 94. Weld flange 21 includes circumferential weld feet or contacts 96 spaced-apart from one another. Contacts 96 are formed to engage exterior surface 26 of fuel tank 16. Contacts 96 and fuel tank 16 are welded together using suitable known techniques such as hot plate welding to establish a vapor and liquid seal therebetween. In addition, as shown in FIG. 3, weld flange 21 has a predetermined dimension 98 that is greater than a second dimension 100 of aperture 30 to prevent retainer 14 from moving through aperture 30.

Seat 22 of retainer 14 is formed integrally with body portion 18. As shown in FIG. 2, seat 22 includes a fixed-end portion 102 coupled to body portion 18 and an opposite free-end portion 104 extending into passageway 20 spaced-apart from fixed-end portion 102. Free-end portion 104 is generally fixed in a stationary position within passageway 20 and retainer blocks 60 yieldably deflect away from inner side 88 as shown by arrow 105 when pressed by seat 22, as will be discussed hereafter. In addition, seat includes an axially inner face 107 and an axially outer face 109. Axially outer face 109 cooperates with upper portion 92 of body portion 18 to define a seating region 111 in passageway 20.

Valve assembly 12 and retainer 14 are manufactured separately and subsequently assembled in an axial press-fit. In order to assemble fuel tank valve apparatus 10, an assembly worker illustratively grasps housing 32 of valve assembly 12 and aligns body portion 50 with passageway 20 of body portion 18, as shown in FIG. 1. As shown in FIG. 2, the worker simply slides body portion 50 through passageway 20 until surface 74 of retainer block 60 engages free-end portion 104 of seat 22. As shown in FIG. 2, housing 32 is further pressed in an axially inwardly direction as shown by arrow 116, yieldably biasing retaining blocks 60 the radially inward direction as shown by arrow 105 until flange 58 lies within seating region 111 and inner face 107 of seat 22 engages retainer surface 72 of retainer block 66. While in seating region 111, flange 58 presses gasket 64 against seat 22 of retainer 14 to form a liquid fuel and vapor seal therebetween.

At this time, the worker grasps retainer 14 and places contacts 96 of weld flange 21 upon fuel tank 16 such that passageway 20 is aligned with aperture 30 in fuel tank 16, as shown in FIG. 3. Retainer 14 and fuel tank 16 are welded together using suitable known techniques such as hot plate welding. Thus, retainer 14 is effectively integrated into fuel tank 14 by the welding process.

Alternatively, a manufacturer may couple retainer 14 to fuel tank 16 prior to coupling valve assembly 12 and retainer 14 together. Retainer 14 and fuel tank 16 are coupled together as discussed above. Once retainer 14 is coupled to fuel tank 16, valve assembly 12 and retainer 14 are coupled together as discussed above. As shown in FIG. 3, once coupled to fuel tank 16, body portion 50 is prevented from sliding through passageway 20 of retainer 14 as well as aperture 30 in fuel tank 16 and a liquid fuel and vapor seal is established between retainer 14 and fuel tank 16 and retainer 14 and valve assembly 12.

Figure 4:
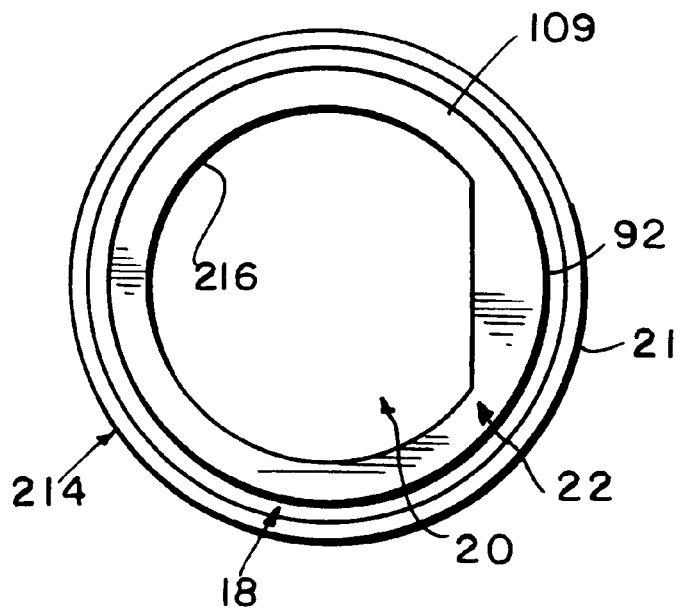
FIG. 4 is a top view of a retainer in accordance with the present invention showing the seat of the retainer including a generally D-shaped lip defining the passageway.

Referring now to FIGS. 4 and 5, retainer 214 is also provided in accordance with the present invention. Retainer 214 is formed similarly to retainer 14 and like reference numerals will be used to denote like components. As shown in FIG. 4, seat 22 of retainer includes a lip 216 that is generally D-shaped. D-shaped lip 216 is configured to prevent a valve assembly having a body portion (no shown) with a corresponding D-shape from rotating relative to fuel tank 16. Lip 216 further defines an opening 218 into passageway 20. Further explanation of the structure and operation of lip 216 is found in U.S. Pat. No. 4,966,189 to Harris, which is incorporated herein by reference.

As shown in FIGS. 6–7, valve assembly 12 having an o-ring gasket 13 is suitable for use with a retainer 314 in accordance with the present invention. Retainer 314 is formed similarly to retainer 14 of FIG. 1 and like reference numerals will be used to denote like components. Retainer 314 includes a mount ring 322 that is distinct from body portion 18 and extends from seat 22 into passageway 20. Ring 322 of retainer 14 is constructed of a metal, such as for example, stainless steel. Continuing to refer to FIG. 6, ring 322 includes a fixed-end portion 324 coupled to seat 22 and an opposite free-end portion 326 extending through a radially inner face 327 of seat 22 into passageway 20 spaced-apart from fixed-end portion 324. As best shown in FIG. 6, free-end portion 326 is generally fixed in a stationary position within passageway 20 and retainer blocks 60 yieldably deflect away from inner side 88 as shown by arrow 105 when pressed by ring 322, as will be discussed hereafter.

Valve assembly 12 and retainer 314 are manufactured separately and subsequently assembled in an axial press-fit. In order to assemble fuel tank valve apparatus 310, an assembly worker illustratively grasps housing 32 of valve assembly 12 and aligns body portion 50 with passageway 20 formed in retainer 314, as shown in FIG. 6. The worker simply slides body portion 50 through passageway 20 until angled surface 74 of retainer block 60 engages free-end portion 326 of ring 322. As shown in FIG. 6, housing 32 is further pressed in an axially inwardly direction as shown by arrow 116, yieldably biasing retaining blocks 60 the radially inward direction as shown by arrow 105 until flange 58 presses o-ring seal 13 against seat 22 and retainer surface 72 of retainer block 60 engages seat 22, as shown in FIG. 7 to form a fuel vapor a liquid fuel seal between valve assembly 12 and retainer 314. While o-ring seal 13 is described herein, it is understood that gasket 64 or any number of seals may be used in accordance with the present invention to create a fuel vapor and liquid fuel seal between housing 32 and retainer 314.

At this time, the worker grasps retainer 14 and places contacts 96 of weld flange 21 upon fuel tank 16 such that passageway 20 is aligned with aperture 30 in fuel tank 16, as shown in FIG. 7. Retainer 314 and fuel tank 16 are welded together using suitable known techniques such as hot plate welding. Thus, retainer 314 is effectively integrated into fuel tank 16 by the welding process and a liquid fuel and vapor seal is formed between retainer 314 and fuel tank 16.

Alternatively, a manufacturer may couple retainer 314 to fuel tank 16 prior to coupling valve assembly 12 and retainer 314 together. Retainer 314 and fuel tank 16 are coupled together as discussed above. Once retainer 314 is coupled to fuel tank 16, valve assembly 12 and retainer 314 are coupled together as discussed above.

A retainer 414 is also provided in accordance with the present invention and is shown in FIG. 8. Retainer 414 is suitable for use with valve assembly 12 having a generally flat seal 15 coupled to flange 58 to form a fuel tank valve apparatus 410. Retainer 314 is formed similarly to retainer 14 of FIG. 1 and like reference numerals will be used to denote like components. Retainer 414 includes a mount ring 422 that is distinct from body portion 18 and is coupled to axially inner face 107 of seat 22. Ring 422 of retainer 14 is constructed of a metal, such as for example, stainless steel. Continuing to refer to FIG. 8, ring 322 is fixed in a stationary position against seat 22 and retainer blocks 60 yieldably deflect away from inner side 88 as shown by arrow 105 when pressed by seat 22. Ring 422 provides support for seat 22 when housing 32 is in the fully mounted position shown in FIG. 8. Valve assembly 12 and retainer 314 are manufactured separately and subsequently assembled in an axial press-fit in a manner described above with reference to retainer 14. When assembled, seal 15 is pressed between flange 58 and seat 22 to create a liquid fuel and vapor seal therebetween.

Figure 9:
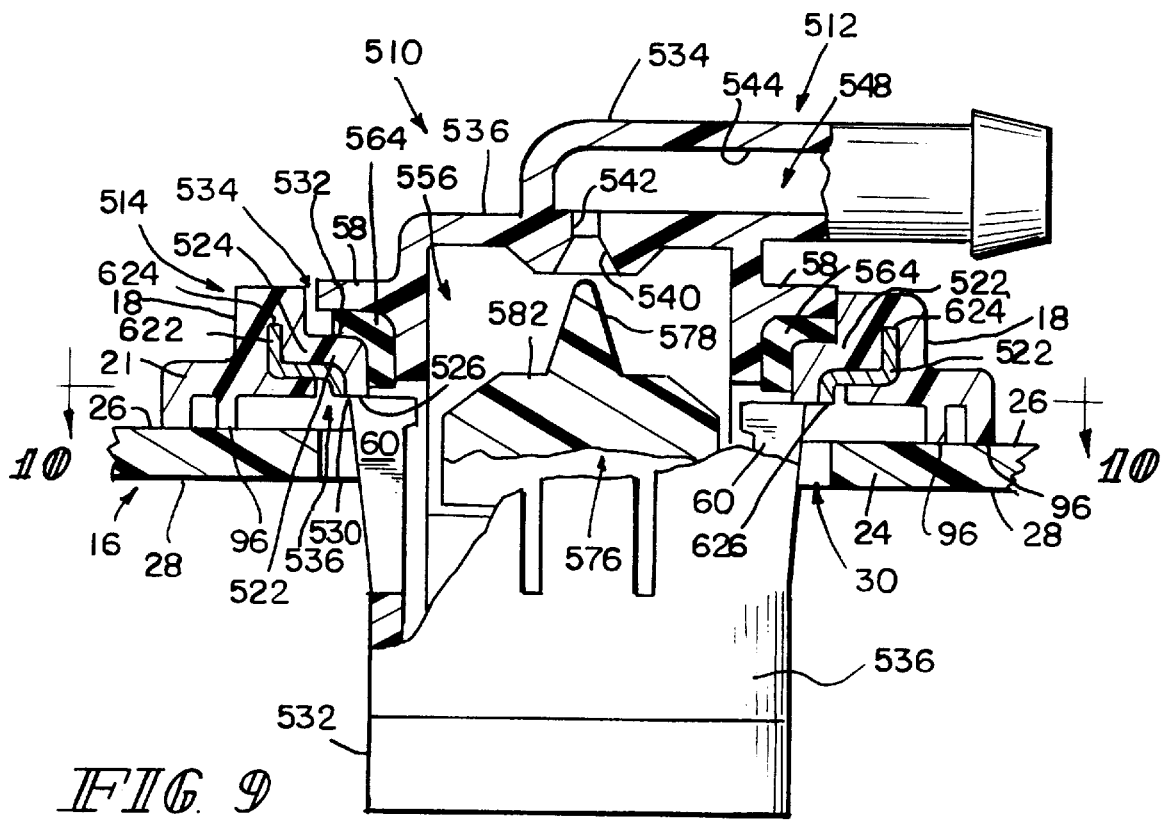
FIG. 9 is a sectional detail view of the fuel tank of FIG. 1 and a fuel tank valve apparatus in accordance with the present invention showing the valve apparatus including a body portion having circumferentially spaced-apart retainer blocks and a retainer including a seat, an axially upper portion configured to be coupled to the valve assembly, and a larger diameter axially lower portion configured to be welded to an exterior surface of the fuel tank wall to mount the valve assembly in a fixed position in the aperture formed in the fuel tank wall.
Figure 10:
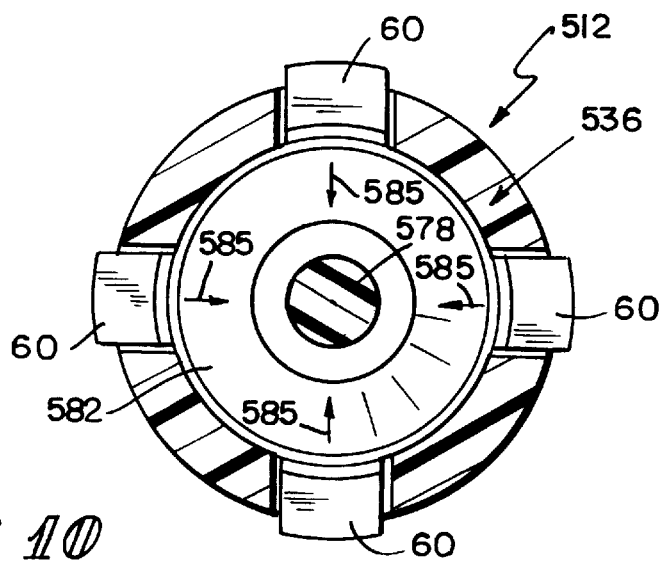
FIG. 10 is a cross-sectional view taken along lines 10—10 of FIG. 9 showing the circumferentially spaced apart retainer blocks.

FIGS. 9 and 10 illustrate a fuel tank valve apparatus 510 in accordance with an embodiment of the present invention. Apparatus 510 includes a valve assembly 512 and a retainer 514. Retainer 514 is formed to be welded to fuel tank 16 to hold secure valve assembly 512 in a fixed place in fuel tank 16. Retainer 514 is formed similarly to retainer 14 and like reference numerals will be used to denote like components.

Valve assembly 512 is retained in fuel tank 16 by retainer 514. Referring now to FIG. 9, valve assembly 512 includes a housing 532 constructed from acetal and including an upper portion 534 that remains outside of fuel tank 16 and a cylindrical lower portion 536 that extends through passageway 20 into fuel tank 16 to communicate with fuel vapor and liquid fuel contained in fuel tank 16. Lower portion 536 includes a top wall 536 that is formed to include an axially downwardly-facing valve seat 540. Valve seat 540 defines an outlet 542. Valve assembly 512 is formed similarly to valve assembly 12 and like reference numerals will be used to denote like components.

Referring now to FIG. 9, upper portion 534 of housing 532 is configured to extend away from retainer 514 when the vale assembly 512 is in a fully mounted position in passageway 20 of retainer 514. Upper portion 534 includes an interior wall 544 that defines a vapor-discharge chamber 546 and a vapor-discharge opening 548. A gasket 564 is positioned to lie adjacent to flange 58 to establish a vapor and liquid seal between housing 532 and body portion 18. It will be appreciated that this sealed connection could be accomplished in a number of different ways as long as fuel vapor or liquid fuel is unable to escape fuel tank 16 through the joint between flange 58 and body portion 18.

A valve 576 is installed in lower portion 532 to control fluid flow through outlet 542. As shown in FIG. 2, valve 576 includes a nipple 578 and a float member 582 arranged in central passage 556. Float member 582 is movable in central passage 556 to control the discharge of liquid fuel and pressurized fuel vapor from fuel tank 16 through outlet 542 during, for example, sloshing of liquid fuel in fuel tank 16 as a result of vehicle movement of cornering, development of high pressure of fuel vapor in fuel tank 16, filling fuel tank 16 with liquid fuel during fueling, and tilting or inversion of vehicle containing tank as a result of vehicle rollover. It is appreciated that any number of valves may be used in accordance with this disclosure.

Retainer 514 includes a seat 522 that is formed integrally with body portion 18. Continuing to refer to FIG. 9, seat 522 includes a fixed-end portion 524 coupled to body portion 18 and an opposite free-end portion 526 extending into passageway 20 spaced-apart from fixed-end portion 524. In addition, seat 522 includes an axially inner face 530 and an axially outer face 532. Axially outer face 532 cooperates with upper portion 92 of body portion 18 to define a seating region 534 in passageway 20. Inner face 540 includes a notch 536 formed therein.

Retainer 514 further includes a mount ring 622 that is distinct from body portion 18 and is coupled to seat 522. Ring 622 of retainer 514 is constructed of a metal, such as for example, stainless steel. Continuing to refer to FIG. 9, ring 622 includes an upper-end portion 624 coupled to seat 522 and an opposite lower-end portion 626 positioned to lie adjacent to inner face 530 spaced-apart from fixed-end portion 624. Retainer blocks 60 of valve assembly 512 yieldably deflect, as shown by arrows 585 in FIG. 10, when pressed by seat 522 in a manner previously described with reference to seat 22 and retainer block 60. Valve assembly 12 and retainer 314 are manufactured separately and subsequently assembled in an axial press-fit as previously described with reference to valve assembly 12 and retainer 14.

Although the invention has been described in detail with reference to a preferred embodiment, variations and modifications exist within the scope and spirit of the invention as described and defined in the following claims and defined in the following claims.

What is claimed is:

1. An apparatus for mounting a vent valve assembly in an aperture of a fuel tank, the apparatus comprising
    a valve assembly including a housing having a body portion, a flange coupled to the body portion, and a retainer block extending from the body portion spaced-apart from the flange and a valve positioned to lie in the housing, and
    a retainer adapted to be coupled to an exterior surface of the fuel tank, the retainer including a body portion defining a passageway being sized to receive the body portion of the housing therein, an attachment portion for scaling securement to the fuel tank and a seat formed integrally with the body portion of the retainer and having a free end extending into the passageway, the flange and the retainer block cooperating with the seat to couple the valve assembly and retainer together.

2. The apparatus of claim 1, wherein the seat includes a fixed-end portion coupled to the body portion and a free-end portion positioned to lie in the passageway.

3. The apparatus of claim 2, wherein the attachment portion of the body portion of the retainer includes an axially outer end and the seat is spaced-apart from the outer end.

4. The apparatus of claim 2, wherein the free-end portion is fixed in a stationary position within passageway.

5. The apparatus of claim 1, wherein the retainer block includes a retainer surface positioned to face toward the flange and an angled surface extending between the retainer surface and the body portion.

6. The apparatus of claim 5, wherein the seat engages the retainer surface when the flange engages the body portion to couple the body portion in the passageway of the retainer.

7. The apparatus of claim 1, wherein a metal ring is coupled to the seat.

8. The apparatus of claim 7, wherein the seat includes an axially inner face and the metal ring is coupled to the inner face.

9. The apparatus of claim 1, wherein the retainer block is movable relative to the body portion.

10. An apparatus for mounting a vent valve assembly in an aperture of a fuel tank, the apparatus comprising
    a valve assembly including a housing having a body portion, a flange coupled to the body portion, and a retainer block extending from the body portion spaced-apart from the flange and a valve positioned to lie within the housing, and
    a retainer including a body portion formed to include an upper portion, an lower portion, a passageway extending between the outer and lower portions and being sized to receive the body portion of the valve assembly, a weld flange extending from the lower portion and adapted to be coupled to an exterior surface of the fuel tank, and a seat coupled to the body portion and extending into the passageway, the flange and retainer block of the housing cooperating with the seat of the retainer to couple the valve assembly and retainer together.

11. The apparatus of claim 10, wherein the weld flange includes a contact extending away from the body portion generally parallel to the body portion of the valve assembly.

12. The apparatus of claim 11, wherein the weld flange includes two concentrically aligned contacts.

13. The apparatus of claim 10, wherein the retaining blocks are flexible relative to the body portion of the housing.

14. The apparatus of claim 13, wherein the retainer block includes a retainer surface positioned to face the flange and an angled surface extending between the retainer surface and the body portion of the housing.

15. The apparatus of claim 10, wherein the retainer further includes a metal ring coupled to the seat.

16. A fuel tank assembly comprising a fuel tank formed to include a wall having an exterior surface, an interior surface, and an aperture extending between the exterior and interior surfaces, a valve assembly including a housing having a body portion extending through the aperture, a flange coupled to the body portion, and a flexible retainer block extending from the body portion spaced-apart from the flange, and a retainer including a body portion formed to include a weld flange coupled to the exterior surface of the fuel tank, a passageway in general alignment with the aperture of the fuel tank and sized to receive the body portion of the housing, and a seat extending into the passageway, the flange and retainer block of the housing cooperating with the seat of the retainer to couple the valve assembly and retainer together.

17. The assembly of claim 16, wherein the fuel tank and the body portion of the retainer are constructed of polymeric materials.

18. The assembly of claim 17, wherein the retainer further includes a ring constructed of a metal coupled to the seat.

19. The assembly of claim 16, wherein the weld flange includes contacts spaced apart from one another in engagement with the exterior surface of the fuel tank.

20. The assembly of claim 19, wherein the contacts extend about the periphery of the aperture in the fuel tank.

21. The apparatus of claim 1, wherein a seal is positioned between the flange and the seat.

22. The apparatus of claim 10, wherein the seal is positioned between the flange and the seat.

23. The assembly of claim 17, wherein the seal is positioned between the flange and the seat.

24. The apparatus of claim 1, wherein the seal is configured to lie above and extends around an inward end of the seat.

25. The apparatus of claim 10, wherein the seal is configured to lie above and extends around an inward end of the seat.

26. The assembly of claim 17, wherein the seal is configured to lie above and extends around an inward end of the seat.

* * * * *